US012045075B2

(12) United States Patent
Zsolczai et al.

(10) Patent No.: US 12,045,075 B2
(45) Date of Patent: *Jul. 23, 2024

(54) SUPPLY-GLITCH-TOLERANT REGULATOR

(71) Applicant: Skyworks Solutions, Inc., Irvine, CA (US)

(72) Inventors: Viktor Zsolczai, Szolnok (HU); Andras V. Horvath, Budapest (HU); Peter Onody, Budapest (HU)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,099

(22) Filed: Oct. 11, 2023

(65) Prior Publication Data

US 2024/0118722 A1 Apr. 11, 2024

Related U.S. Application Data

(63) Continuation of application No. 18/084,309, filed on Dec. 19, 2022, now Pat. No. 11,815,928, which is a (Continued)

(51) Int. Cl.

*G05F 1/575* (2006.01)
*G05F 1/46* (2006.01)
*G05F 3/26* (2006.01)

(52) U.S. Cl.

CPC .............. *G05F 1/575* (2013.01); *G05F 1/468* (2013.01); *G05F 3/262* (2013.01)

(58) Field of Classification Search

CPC ................................. G05F 1/575; G05F 1/468

See application file for complete search history.

(56) References Cited

U.S. PATENT DOCUMENTS 5,410,441 A 4/1995 Allman
5,517,379 A 5/1996 Williams et al.
(Continued)

FOREIGN PATENT DOCUMENTS

DE 10 2015 216 928 3/2017
EP 0626745 11/1994
(Continued)

OTHER PUBLICATIONS

Klomark, S., "Design of an Integrated Voltage Regulator", Institution for Systemteknik, Oct. 17, 2003, 54 pages.
(Continued)

*Primary Examiner* — Sisay G Tiku

(74) *Attorney, Agent, or Firm* — Knobbe, Martens, Olson & Bear, LLP

(57) ABSTRACT

A supply-glitch-tolerant voltage regulator includes a regulated voltage node and an output transistor having a source terminal, a gate terminal, and a drain terminal. The source terminal is coupled to the regulated voltage node. The supply-glitch-tolerant voltage regulator includes a first current generator coupled between a first node and a first power supply node. The supply-glitch-tolerant voltage regulator includes a second current generator coupled between the first node and a second power supply node. The supply-glitch-tolerant voltage regulator includes a feedback circuit coupled to the first current generator and the second current generator and is configured to adjust a voltage on the first node based on a reference voltage and a voltage level on the regulated voltage node. The supply-glitch-tolerant voltage regulator includes a diode coupled between the drain terminal and the first power supply node and a resistor coupled between the gate terminal and the first node.

13 Claims, 2 Drawing Sheets

Related U.S. Application Data continuation of application No. 17/119,653, filed on Dec. 11, 2020, now Pat. No. 11,561,563.

(56) References Cited

U.S. PATENT DOCUMENTS

| | | | | |
|---|---|---|---|---|
| 5,539,610 | A | 7/1996 | Williams et al. | |
| 7,091,709 | B2 | 8/2006 | Suzuki | |
| 7,199,565 | B1 | 4/2007 | Demolli | |
| 7,999,523 | B1 | 8/2011 | Caffee et al. | |
| 8,947,112 | B2 | 2/2015 | Yamanobe | |
| 9,261,892 | B2 | 2/2016 | Wang et al. | |
| 9,337,824 | B2 | 5/2016 | Piselli et al. | |
| 9,537,581 | B2 | 1/2017 | Mills et al. | |
| 9,625,925 | B2 | 4/2017 | Yan et al. | |
| 9,817,426 | B2 | 11/2017 | Chellappa | |
| 10,281,943 | B1 | 5/2019 | Ho | |
| 10,296,026 | B2 | 5/2019 | Caffee et al. | |
| 10,784,860 | B1 | 9/2020 | Sakai | |
| 11,561,563 | B2 | 1/2023 | Zsolczai et al. | |
| 11,815,928 | B2 | 11/2023 | Zsolczai et al. | |
| 2005/0248331 | A1 | 11/2005 | Whittaker | |
| 2007/0241731 | A1 | 10/2007 | van Ettinger | |
| 2008/0054867 | A1 | 3/2008 | Soude et al. | |
| 2008/0238385 | A1 | 10/2008 | Nagata et al. | |
| 2008/0303496 | A1 | 12/2008 | Schlueter et al. | |
| 2009/0295360 | A1 | 12/2009 | Hellums | |
| 2010/0117699 | A1 | 5/2010 | Wu et al. | |
| 2010/0156362 | A1* | 6/2010 | Xie | G05F 1/565 323/273 |
| 2010/0156364 | A1* | 6/2010 | Cho | G05F 1/565 323/280 |
| 2011/0121802 | A1 | 5/2011 | Zhu | |
| 2012/0176107 | A1* | 7/2012 | Shrivas | G05F 1/575 323/271 |
| 2013/0082671 | A1 | 4/2013 | Ivanov et al. | |
| 2015/0185747 | A1 | 7/2015 | Liu | |
| 2015/0198960 | A1 | 7/2015 | Zhang et al. | |
| 2015/0286232 | A1 | 10/2015 | Parikh | |
| 2015/0346750 | A1* | 12/2015 | Bhattad | G05F 1/575 323/280 |
| 2016/0224040 | A1 | 8/2016 | Peluso et al. | |
| 2016/0357206 | A1 | 12/2016 | Liu | |
| 2017/0093399 | A1 | 3/2017 | Atkinson et al. | |
| 2017/0115677 | A1 | 4/2017 | Caffee et al. | |
| 2017/0126329 | A1 | 5/2017 | Gorecki et al. | |
| 2017/0160757 | A1 | 6/2017 | Yang | |
| 2017/0244395 | A1 | 8/2017 | Ojha et al. | |
| 2018/0017984 | A1 | 1/2018 | Mayer et al. | |
| 2018/0053463 | A1 | 2/2018 | Kong et al. | |
| 2018/0129234 | A1 | 5/2018 | Melgar et al. | |
| 2018/0173258 | A1 | 6/2018 | Singh | |
| 2018/0219473 | A1 | 8/2018 | Ogino et al. | |
| 2019/0109529 | A1 | 4/2019 | Nobe et al. | |
| 2020/0241584 | A1* | 7/2020 | Kotrc | G05F 1/565 |

FOREIGN PATENT DOCUMENTS

| | | |
|---|---|---|
| EP | 2816438 | 12/2014 |
| WO | WO 2020/086150 | 4/2020 |

OTHER PUBLICATIONS

Onsemi, Semiconductor Components Industries, LLC "Single 6 A High-Speed, Low-Side SiC MOSFET Driver NCP51705", 2017 (Rev. 4—Nov. 2021), 22 pages.

Onsemi, Single 6 A High-Speed, Low-side SiC MOSFET Driver, Semiconductor Components Industries, LLC, 2017, Rev. 3 Apr. 2019, Publication Order No. NCP51705/D, 21 pages.

Rohm Semiconductors, "Isolation voltage 2500Vrms 1ch Gate Driver Providing Galvanic Isolation", Gate Driver Providing Galvanic Isolation Series, BM60054AFV-C Datasheet, Rev. 003, Apr. 23, 2018, 42 pages.

International Search Report and Written Opinion mailed Apr. 5, 2022 for International Application No. PCT/US2021/062156, 11 pages.

* cited by examiner

SUPPLY-GLITCH-TOLERANT REGULATOR

CROSS-REFERENCE TO RELATED APPLICATION(S)

This application is a continuation of U.S. patent application Ser. No. 18/084,309, filed Dec. 19, 2022, entitled "Supply-Glitch-Tolerant Regulator" which is a continuation of U.S. patent application Ser. No. 17/119,653, filed Dec. 11, 2020, entitled "Supply-Glitch-Tolerant Regulator" which application is incorporated herein by reference in its entirety.

BACKGROUND

Field of the Invention

This disclosure is related to integrated circuits, and more particularly to voltage regulation circuits that provide a target voltage level under varying conditions.

Description of the Related Art

In general, a voltage regulator is a system that maintains a constant voltage level. In an exemplary application, the presence of parasitic inductance can cause a high-frequency, large-amplitude AC signal (i.e., ringing) that is superimposed on a power supply node during fast switching of large currents. Depending on the rate of change of the load current in the circuit and the amount of output parasitic capacitance, the power supply voltage level can glitch, e.g., drop to ground for a short period of time during the ringing. A power supply glitch can result in a brownout reset and subsequent initiation of the startup sequence of an integrated circuit system, which is undesirable in normal operation. A goal of a low-dropout regulator is to prevent a regulated voltage from falling from a target regulated voltage level $V_{REG}$ to a voltage level below a specified minimum voltage level during a power supply glitch of less than a specified duration. If that specified minimum voltage level is not exceeded by the regulated output voltage during the power supply glitch, analog circuits and digital circuits will be reset, and states of the digital circuits will be corrupted during and after the power supply glitch. Accordingly, improved techniques for regulating a voltage level are desired.

SUMMARY OF EMBODIMENTS OF THE INVENTION

In at least one embodiment, a supply-glitch-tolerant voltage regulator includes a regulated voltage node and an output transistor having a source terminal, a gate terminal, and a drain terminal. The source terminal is coupled to the regulated voltage node. The supply-glitch-tolerant voltage regulator includes a first current generator coupled between a first node and a first power supply node. The supply-glitch-tolerant voltage regulator includes a second current generator coupled between the first node and a second power supply node. The supply-glitch-tolerant voltage regulator includes a feedback circuit coupled to the first current generator and the second current generator and is configured to adjust a voltage on the first node based on a reference voltage and a voltage level on the regulated voltage node. The supply-glitch-tolerant voltage regulator includes a diode coupled between the drain terminal and the first power supply node and a resistor coupled between the gate terminal and the first node.

In at least one embodiment, a method for generating a supply-glitch-tolerant reference voltage includes generating an output voltage on a regulated voltage node based on a reference voltage level. The method includes maintaining the output voltage on the regulated voltage node above a predetermined voltage level during a glitch of a power supply voltage across a first power supply node and a second power supply node. The glitch has a duration less than or equal to a target supply-glitch tolerance.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
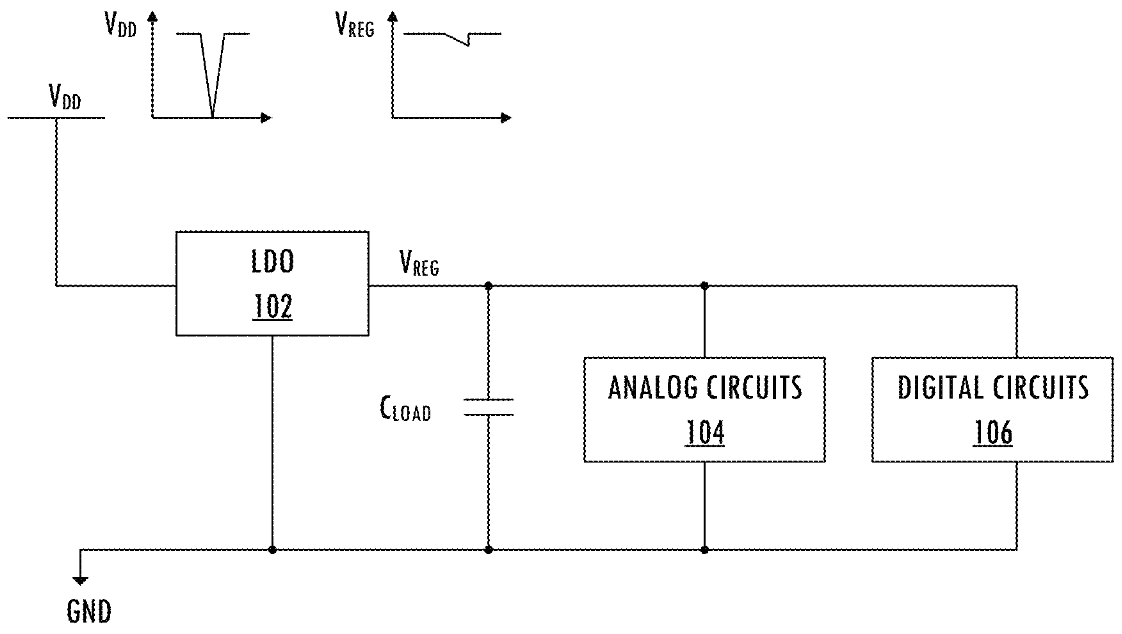
FIG. 1 illustrates a functional block diagram of an integrated circuit low-dropout regulator in an exemplary integrated circuit system.
Figure 2:
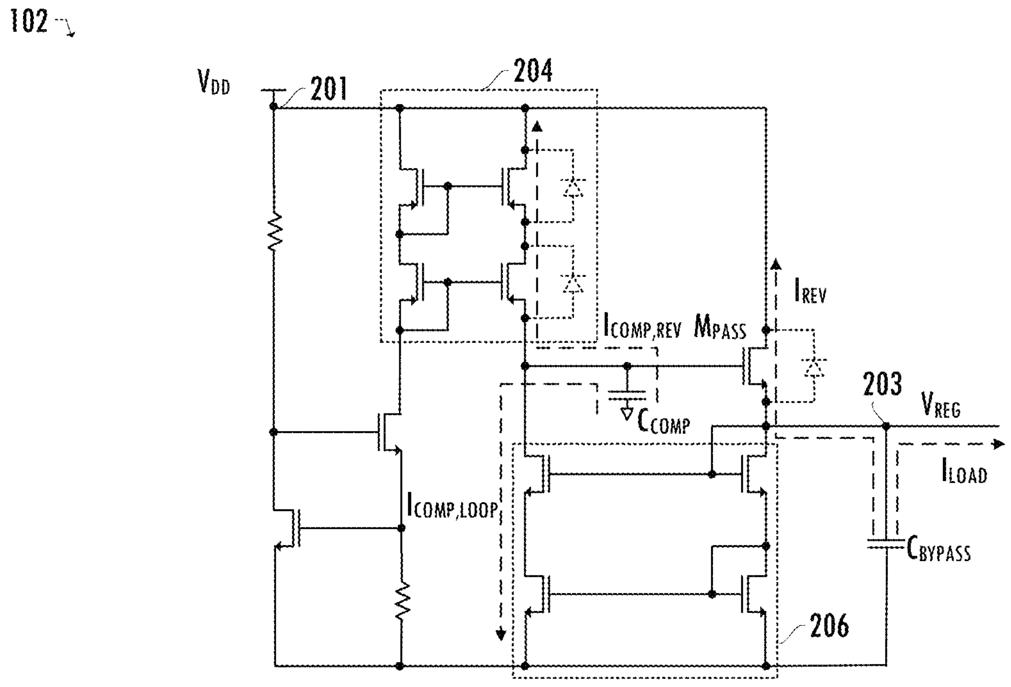
FIG. 2 illustrates a circuit diagram of an exemplary low-dropout regulator and associated current flows in response to an exemplary power supply glitch event.

Referring to FIGS. 1 and 2, low-dropout regulator 102 provides a regulated output voltage level on regulated voltage node $V_{REG}$, which is used as the power supply voltage for analog and digital circuits. Low-dropout regulator 102 includes a source follower output stage (i.e., common drain amplifier, e.g., output transistor $M_{PASS}$, which is n-type in an exemplary embodiment) configured to provide regulated voltage $V_{REG}$ and associated current (e.g., 1 mA). Compensation capacitor $C_{COMP}$ is sized to provide a pole in a loop gain of the low-dropout regulator 102. Regulated voltage $V_{REG}$ on regulated voltage node 203 is based on currents provided by current generator 204 and current generator 206 (e.g., each including a stack of at least one diode-coupled devices) and a control loop that compares regulated voltage $V_{REG}$ to reference voltage level $V_{REF}$.

During an exemplary power supply glitch event having a duration $t_{GLITCH}$ (e.g., $t_{GLITCH}$=50-100 ns) the voltage level on power supply node 201 falls from VDD to ground. Whenever the drain voltage of output transistor $M_{PASS}$ falls below regulated voltage $V_{REG}$, the parasitic body diode of output transistor $M_{PASS}$ becomes forward biased and draws reverse current $I_{REV}$, which is relatively large, from bypass capacitance $C_{BYPASS}$ and through a parasitic diode of the source follower output stage to power supply node 201. As the voltage level on power supply node 201 falls from VDD to ground, compensation capacitor $C_{COMP}$, which is coupled to the gate of output transistor $M_{PASS}$, also starts discharging via two currents: compensation loop current $I_{COMP,LOOP}$, which is a small bias current, and reverse compensation current $I_{COMP,REV}$. Reverse compensation current $I_{COMP,REV}$ flows from compensation capacitor $C_{COMP}$ through parasitic diodes of current generator 204 to power supply node 201. Compensation loop current $I_{COMP,LOOP}$, flows from compensation capacitor $C_{COMP}$ to ground and bypass capacitance $C_{BYPASS}$ starts discharging. Reverse compensation current $I_{COMP,REV}$ is large enough to discharge the gate capacitance completely during a power supply glitch and recharging compensation capacitor $C_{COMP}$ after the power supply glitch can take a very long time, during which load current $I_{LOAD}$ continues to discharge bypass capacitance $C_{BYPASS}$. Accordingly, regulated voltage $V_{REG}$ on regulated voltage node 203 falls from a target regulated voltage level to ground and a brownout reset occurs. After the power supply glitch, the voltage level on power supply node 201 returns to VDD and regulated voltage $V_{REG}$ on regulated voltage node 203 is restored to the target regulated voltage level. In response, the integrated circuit system coupled to low-dropout regulator 102 reinitiates a startup sequence, analog circuits 104 and digital circuits 106 will be reset, and states of the digital circuits 106 are corrupted.

Figure 3:
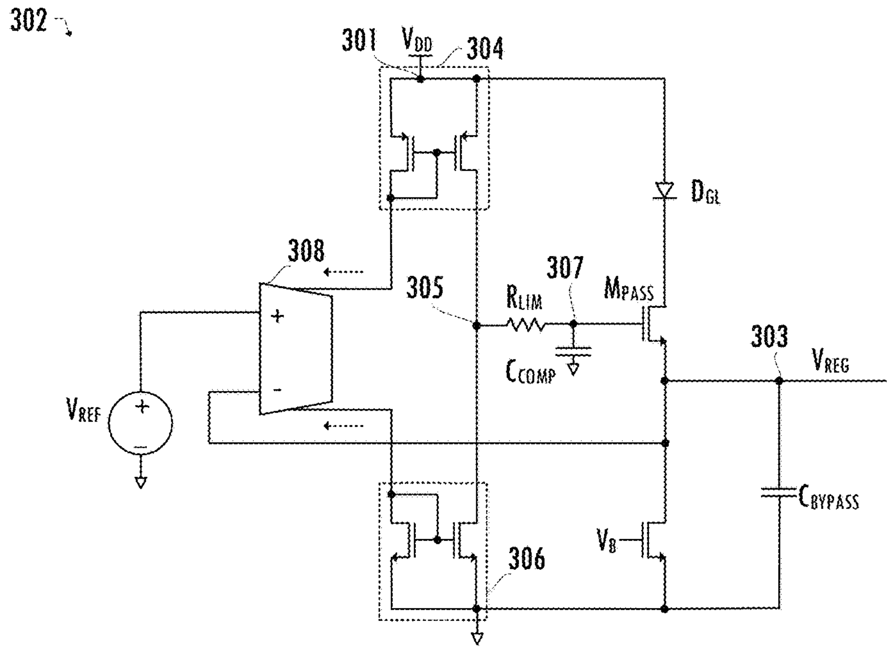
FIG. 3 illustrates a circuit diagram of an exemplary supply-glitch-tolerant voltage regulator consistent with at least one embodiment of the invention.

Referring to FIG. 3, supply-glitch-tolerant regulator 302 provides regulated voltage $V_{REG}$ on regulated voltage node 303 that is robust against transient, large-amplitude noise on power supply node 301. Supply-glitch-tolerant regulator 302 includes a source follower output stage (i.e., common drain amplifier, e.g., output transistor $M_{PASS}$, which is n-type in an exemplary embodiment) configured to provide regulated voltage $V_{REG}$ and associated current (e.g., 1 mA). The voltage level on regulated voltage node 303 is based on currents provided by current generator 304 and current generator 306 (e.g., each including a current mirror or cascoded current mirrors) and a control loop including transconductance amplifier 308 that compares regulated voltage $V_{REG}$ on regulated voltage node 303 to reference voltage level $V_{REF}$. Transconductance amplifier 308 causes current generator 304 and current generator 306 to adjust the voltage on node 305 and the voltage on node 307, the gate of output transistor $M_{PASS}$, to adjust the level of regulated voltage $V_{REG}$ according to the comparison. In at least one embodiment, supply-glitch-tolerant regulator 302 includes diode $D_{GL}$, which blocks any flow of reverse current $I_{REV}$ from bypass capacitance $C_{BYPASS}$ to power supply node 301 through a parasitic diode of the source follower output stage. Diode $D_{GL}$ is coupled in series with the drain of output transistor $M_{PASS}$ and has, at most, negligible impact on normal operation of supply-glitch-tolerant regulator 302.

In at least one embodiment, to reduce or eliminate substantial discharge of bypass capacitance $C_{BYPASS}$, in addition to diode $D_{GL}$, supply-glitch-tolerant regulator 302 includes limiting resistor $R_{LIM}$ (e.g., $R_{LIM}$=60 kΩ) which blocks the flow of reverse compensation current $I_{COMP,REV}$ from compensation capacitor $C_{COMP}$ (e.g., $C_{COMP}$=10 pF) via node 307 through parasitic diodes of current generator 304 to power supply node 301. Limiting resistor RUM is coupled in series with the gate of output transistor $M_{PASS}$, separating compensation capacitor $C_{COMP}$ from the body diodes of the p-type devices in current generator 304. Limiting resistor $R_{LIM}$ limits the reverse current to a low level that is insufficient to cause a large voltage drop on the gate of output transistor $M_{PASS}$ during a power supply glitch, but is also small enough that it does not influence the normal operation of supply-glitch-tolerant regulator 302 since limiting resistor $R_{LIM}$ is coupled in series with two opposing current generators that provide a substantially larger impedance (i.e., $R_{LIM} \ll (Z_{304} \| Z_{306})$). Limiting resistor $R_{LIM}$ and compensation capacitor $C_{COMP}$ have a time constant (i.e., $\tau = R_{LIM} \times C_{COMP}$, e.g., $R_{LIM} \times C_{COMP}$=600 ns) that is greater than a specified power supply glitch tolerance $\Delta t_{GLITCH\_TOL}$ (e.g., $\Delta t_{GLITCH\_TOL}$=100 ns for a regulated voltage lower limit of 3.5 V or 1.9 V) of supply-glitch-tolerant regulator 302.

In at least one embodiment, since circuits that receive power from regulated voltage node 303 must remain functional, bypass capacitance $C_{BYPASS}$ is sized so that the voltage drop caused by the net charge loss (e.g., $I_{LOAD} \times \Delta t_{GLITCH}$, where $I_{LOAD}$ is the useful load current and $\Delta t_{GLITCH}$ is the duration of the power supply glitch) is insufficient to decrease regulated voltage $V_{REG}$ to a level below a specified lower limit. Supply-glitch-tolerant regulator 302 prevents regulated voltage $V_{REG}$ on regulated voltage node 303 from falling below a target minimum level during a power supply glitch that is shorter than the specified glitch tolerance. Thus, analog circuits and digital circuits powered by regulated voltage $V_{REG}$ on regulated voltage node 303 do not reset in response to the power supply glitch, and the digital circuits retain their states during and after the power supply glitch, providing seamless operation of the integrated circuit system, even under nonideal circumstances.

Figure 4:
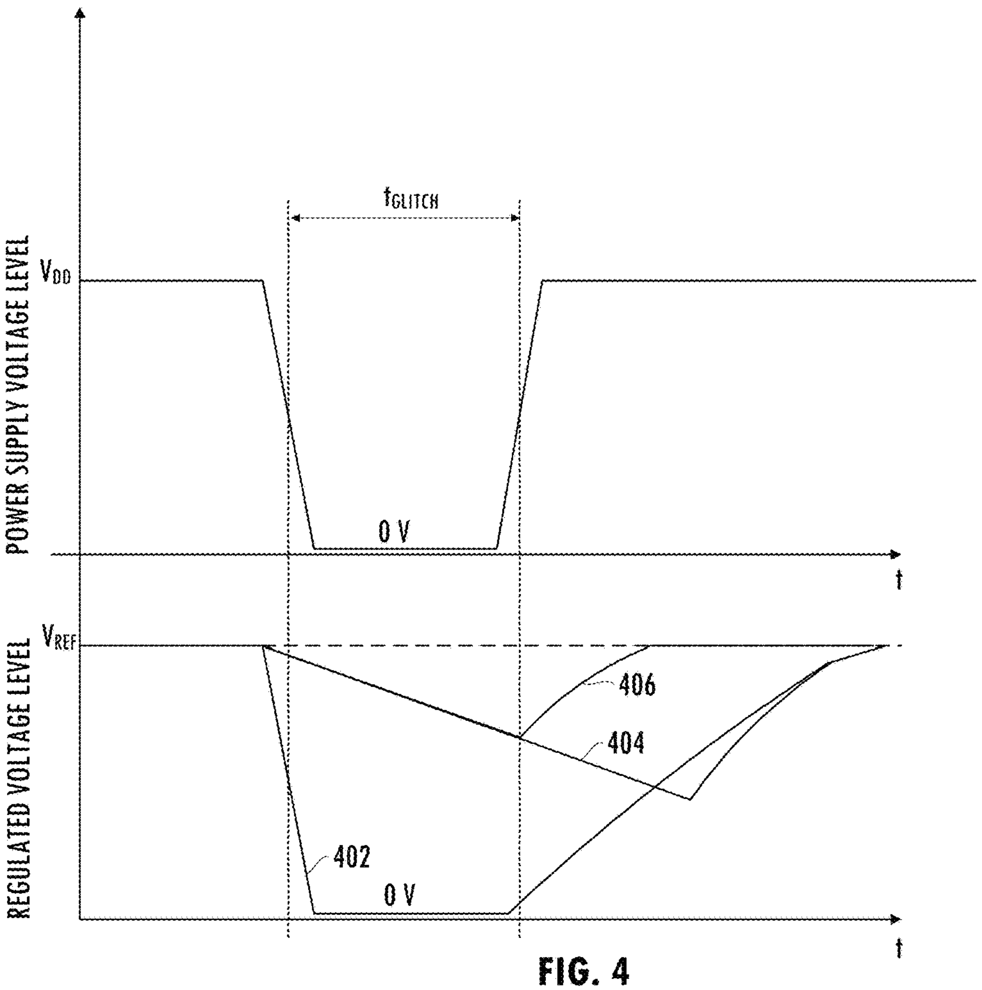
FIG. 4 illustrates exemplary waveforms for an exemplary power supply glitch event and associated responses of various embodiments of a voltage regulator consistent with at least one embodiment of the invention.

Referring to FIG. 4, a simplified timing-diagram illustrating the voltage level on power supply node VDD and regulated voltage $V_{REG}$ on regulated voltage node 303 during an exemplary power supply glitch event. If a voltage regulator includes no protection from a power supply glitch, regulated voltage $V_{REG}$ falls from the target regulated voltage level to ground immediately in response to the start of the power supply glitch event and a relatively long time elapses before the regulated output voltage level returns to the target regulated voltage level, as illustrated by waveform 402. Waveform 404 corresponds to a voltage regulator including diode $D_{GL}$, alone. Diode $D_{GL}$ reduces the rate of change to regulated voltage $V_{REG}$, but regulated voltage $V_{REG}$ continues to decrease after the power supply glitch ends, which can cause regulated voltage $V_{REG}$ to fall below a specified voltage limit. In an exemplary embodiment, diode $D_{GL}$ and limiting resistor RUM are included in supply-glitch-tolerant regulator 302, where $R_{LIM} \times C_{COMP} > \Delta t_{GLITCH}$ (e.g., $\Delta t_{GLITCH} \leq 100$ ns). The inclusion of limiting resistor $R_{LIM}$ in addition to diode $D_{GL}$ prevents the gate capacitor from discharging and regulated voltage $V_{REG}$ starts recovering to the target regulated voltage level right after the power supply glitch has ended, as illustrated by waveform 406. Thus, by including diode $D_{GL}$ and limiting resistor $R_{LIM}$, with a suitable selection of bypass capacitance $C_{BYPASS}$, regulated voltage $V_{REG}$ on regulated voltage node 303 stays within specified limits.

Although supply-glitch-tolerant regulator 302 has been described in an embodiment in which output transistor $M_{PASS}$ is n-type, one of skill in the art will appreciate that the teachings herein can be utilized with a p-type output transistor and circuitry that is complementary to the circuit illustrated in FIG. 3. In addition, teachings herein can be utilized with a target regulated voltage level that is close to VDD or above VDD, a target regulated voltage level that is close to ground or below ground, or a target regulated voltage level that is in between VDD, ground, or other power supply voltage. Furthermore, teachings herein can be utilized with voltage regulators including other feedback control loop circuitry.

Thus, embodiments of a supply-glitch-tolerant voltage regulator is disclosed. Supply-glitch-tolerant regulator 302 maintains regulated voltage $V_{REG}$ at a level that is sufficient to maintain the state of digital circuits in the event of a transient (i.e., relatively short) loss of power on power supply node 301 using a small, internal filter capacitor and a small, internal limiting resistor. Supply-glitch-tolerant regulator 302 does not require relatively large external capacitance and achieves regulation under nonideal circumstances without increased current consumption. Embodiments of a supply-glitch-tolerant voltage regulator will maintain sufficient power to analog and digital circuits in the event of a power supply glitch of a specified duration. The embodiments of a supply-glitch-tolerant voltage regulator do not require a large external capacitance and do not increase power consumption, as compared to a conventional voltage regulator.

The description of the invention set forth herein is illustrative and is not intended to limit the scope of the invention as set forth in the following claims. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. A voltage regulator comprising:

an output transistor configured to output a regulated voltage;

a bypass capacitor connected to the output transistor;

a compensation capacitor connected to the output transistor;

a limiting resistor configured to limit reverse current flow from the compensation capacitor to a level that is insufficient to cause an above tolerance voltage drop on a gate of the output transistor, an impedance of the limiting resistor less than an impedance of a first current generator and less than an impedance of a second current generator, and the limiting resistor and the compensation capacitor having a time constant that is greater than a target glitch tolerance of the voltage regulator;

the first current generator coupled between the limiting resistor and a power supply node; a diode connected between the power supply node and the output transistor; and the second current generator coupled between the limiting resistor and ground.

2. The voltage regulator of claim 1 wherein the output transistor is part of a source follower output stage.

3. The voltage regulator of claim 1 wherein a size of the compensation capacitor is such that a decrease in the regulated voltage due to a voltage drop caused by net charge loss is less than a threshold voltage drop limit.

4. The voltage regulator of claim 1 further comprising a feedback circuit coupled to the first current generator and the second current generator and configured to adjust a voltage on a node between the limiting resistor and the first current generator based on a reference voltage and a voltage level on an output node.

5. The voltage regulator of claim 1 wherein the diode is configured to block reverse current from the bypass capacitor to the power supply node.

6. The voltage regulator of claim 1 wherein the first current generator includes a first cascoded current mirror coupled between the limiting resistor and the power supply node, and the second current generator includes a second cascoded current mirror coupled between the limiting resistor and the ground.

7. A voltage regulator comprising:

an output transistor connected to an output voltage node and configured to output a regulated voltage;

a first current generator connected between a first node and a power supply node;

a second current generator coupled between the first node and a ground; and a protection circuit configured to maintain a voltage level on the output voltage node above a predetermined voltage level during a glitch of a power supply voltage across the power supply node, the glitch having a duration less than or equal to a target glitch tolerance of the voltage regulator, the protection circuit including a limiting resistor and a diode, the limiting resistor configured to limit reverse current flow from a compensation capacitor to a level that is insufficient to cause an above tolerance voltage drop on a gate of the output transistor, the limiting resistor and the compensation capacitor having a time constant that is greater than a target glitch tolerance of the voltage regulator, and the diode connected between the power supply node and the output transistor.

8. The voltage regulator of claim 7 further comprising a feedback circuit connected to the first current generator and the second current generator, and configured to adjust a voltage on the first node based on a reference voltage and a voltage level on the output voltage node.

9. The voltage regulator of claim 7 wherein the output transistor is an n-type transistor.

10. The voltage regulator of claim 7 wherein a size of the compensation capacitor is such that a decrease in the regulated voltage due to a voltage drop caused by net charge loss is less than a threshold voltage drop limit.

11. The voltage regulator of claim 7 wherein the diode is configured to block reverse current to the power supply node from a bypass capacitor connected to the output transistor.

12. An integrated circuit system comprising:

a low-dropout regulator including an output transistor configured to output a regulated voltage, a bypass capacitor connected to the output transistor, a compensation capacitor connected to the output transistor, a diode, and a limiting resistor configured to limit reverse current flow from the compensation capacitor to a level that is insufficient to cause an above tolerance voltage drop on a gate of the output transistor, an impedance of the limiting resistor less than an impedance of a first current generator and less than an impedance of a second current generator, the first current generator coupled between the limiting resistor and a power supply node, and the second current generator coupled between the limiting resistor and ground, the diode connected between the power supply node and the output transistor, the diode configured to block reverse current from the bypass capacitor to the power supply node, and the limiting resistor and the compensation capacitor having a time constant that is greater than a target glitch tolerance of the low-dropout regulator; and one or more circuits supplied by the low-dropout regulator.

13. The integrated circuit system of claim 12 wherein the low-dropout regulator further includes a feedback circuit coupled to the first current generator and the second current generator and configured to adjust a voltage on a node between the limiting resistor and the first current generator based on a reference voltage and a voltage level on an output node.

* * * * *